United States Patent
Heule et al.

(10) Patent No.: US 9,341,395 B2
(45) Date of Patent: May 17, 2016

(54) ROOM AIR CONDITIONER HAVING A LIQUID-TO-AIR HEAT EXCHANGING DEVICE WITH PELTIER ELEMENTS

(75) Inventors: Stefan Heule, Aesch ZH (CH); Alexandr Sologubenko, Bonstetten (CH)

(73) Assignee: MENTUS HOLDING AG, Cham (CH)

( * ) Notice: Subject to any disclaimer, the term of this patent is extended or adjusted under 35 U.S.C. 154(b) by 197 days.

(21) Appl. No.: 13/985,280

(22) PCT Filed: Feb. 13, 2012

(86) PCT No.: PCT/EP2012/052423
§ 371 (c)(1),
(2), (4) Date: Aug. 13, 2013

(87) PCT Pub. No.: WO2012/110461
PCT Pub. Date: Aug. 23, 2012

(65) Prior Publication Data
US 2013/0319014 A1    Dec. 5, 2013

(30) Foreign Application Priority Data

Feb. 14, 2011 (CH) ........................................ 0256/11

(51) Int. Cl.
*F25B 21/02* (2006.01)
*F25B 21/04* (2006.01)
(Continued)

(52) U.S. Cl.
CPC . *F25B 21/04* (2013.01); *F24D 3/00* (2013.01); *F24D 12/02* (2013.01); *F24D 13/04* (2013.01); *F24F 1/0007* (2013.01); *F24F 3/06* (2013.01); *F24F 5/0042* (2013.01); *F24F 13/30* (2013.01);
(Continued)

(58) Field of Classification Search
CPC ........ F25B 21/02; F25B 21/04; F24F 5/0042; H01L 35/30
USPC ................................. 22/3.3, 3.4, 3.6, 3.7, 3.2
See application file for complete search history.

(56) References Cited

U.S. PATENT DOCUMENTS 5,422,787 A * 6/1995 Gourdine ...................... 361/697
5,931,000 A * 8/1999 Turner et al. .................... 62/3.2
(Continued)

FOREIGN PATENT DOCUMENTS

CN    2111486 U    7/1992
CN    2519210 Y    10/2002
(Continued)

OTHER PUBLICATIONS

International Preliminary Report on Patentability for International Application No. PCT/EP2012/052423, date of issuance of report, Aug. 21, 2013.
(Continued)

*Primary Examiner* — Melvin Jones
(74) *Attorney, Agent, or Firm* — Nixon Peabody LLP

(57) ABSTRACT

A room air conditioner with a liquid-to-air heat exchanging device for the exchange of heat between a liquid and air has a first flow channel for the air and a second flow channel for the liquid, and at least one Peltier element. The heat exchanging device is subdivided into a first stage in which a heat exchange occurs in a passive manner between the liquid and air, and a subsequent second stage in which heat is pumped from the liquid to the air or from the air to the liquid by supplying an electrical current to the at least one Peltier element.

20 Claims, 5 Drawing Sheets

(51) Int. Cl.

| | |
|---|---|
| *F24D 12/02* | (2006.01) |
| *F24F 1/00* | (2011.01) |
| *F24F 3/06* | (2006.01) |
| *F24F 5/00* | (2006.01) |
| *F24F 13/30* | (2006.01) |
| *F24H 3/12* | (2006.01) |
| *F24H 9/00* | (2006.01) |
| *F24H 9/20* | (2006.01) |
| *F24D 3/00* | (2006.01) |
| *F24D 13/04* | (2006.01) |
| *F28D 7/00* | (2006.01) |

(52) U.S. Cl.
CPC ............... *F24H 3/12* (2013.01); *F24H 9/0015* (2013.01); *F24H 9/0063* (2013.01); *F24H 9/2071* (2013.01); *F28D 7/0008* (2013.01); *F24F 2001/0077* (2013.01); *F24H 2250/06* (2013.01); *Y02B 30/14* (2013.01)

(56) References Cited

U.S. PATENT DOCUMENTS

| | | | |
|---|---|---|---|
| 5,931,002 A | * | 8/1999 | Nagashima ...................... 62/3.7 |
| 6,196,003 B1 | | 3/2001 | Macias et al. |
| 2003/0188538 A1 | | 10/2003 | Chu et al. |

FOREIGN PATENT DOCUMENTS

| | | |
|---|---|---|
| DE | 1 215 330 | 4/1966 |
| DE | 1 817 077 | 8/1970 |
| GB | 970327 | 9/1964 |
| GB | 1 218 727 | 1/1971 |
| JP | 2-219926 A | 9/1990 |
| RU | 2 142 371 C1 | 12/1999 |

OTHER PUBLICATIONS

Notification of Reason for Refusal in Japanese Patent Application No. 2013-552981, dated Dec. 15, 2015.

Examination Report in Russian Application No. 2013142093, dated Jan. 26, 2016.

* cited by examiner

ROOM AIR CONDITIONER HAVING A LIQUID-TO-AIR HEAT EXCHANGING DEVICE WITH PELTIER ELEMENTS

PRIORITY CLAIM

Applicant hereby claims foreign priority under 35 U.S.C §119 from International patent application number PCT/EP2012/052423, filed Feb. 13, 2012, which in turn claims priority to Swiss Application No. 256/11 filed Feb. 14, 2011.

FIELD OF THE INVENTION

The invention relates to a room air conditioner with a liquid-to-air heat exchanging device with Peltier elements.

BACKGROUND OF THE INVENTION

The term "thermoelectric element" or "Peltier heat pump" is often used interchangeably in the field for the term "Peltier element". The term "Peltier element" shall be understood within the scope of the present description and claims as a thermoelectric component which consists in its inner structure of one or several thermoelectric elements. The thermoelectric elements are especially based on the Peltier effect, but they can also be based on another thermoelectric effect such as the principle known as thermo tunnelling.

Peltier elements consist of two metals or two semiconductors which are in contact with each other and are usually known as thermo pairs. When electric direct current flows through a Peltier element, the one metal or the one semiconductor heats up, whereas the other metal or other semiconductor will cool off. A Peltier element therefore works as a current-operated heat pump which conveys heat by means of an electric current from the one surface of the Peltier element to the opposite surface of the Peltier element, or vice versa, i.e. it cools the one surface while simultaneously heating the other surface.

A heating and cooling installation for a building with several rooms is known from DE 1817077. The installation comprises a central heating device and Peltier heat pumps arranged in the rooms. The Peltier heat pumps are connected to the central heating device via a heat transfer circuit. The central heating device supplies the main proportion of the heating or cooling power, whereas the Peltier heat pumps are used for fine adjustment of the temperature in the individual rooms.

SUMMARY OF THE INVENTION

The invention is based on the object of improving the efficiency of such a heating and cooling installation.

The result of the invention is a room air conditioner with a liquid-to-air heat exchanging device for the exchange of heat between a liquid and air, which comprises a first flow channel for the air and a second flow channel for the liquid. The heat exchanging device comprises a first stage in which the two flow channels are separated by a thermally passive separating wall, and a subsequent second stage in which the two flow channels are separated by a thermally active separating wall. The thermally passive separating wall consists of a material that conducts heat well. The thermally active separating wall consists of at least one Peltier element or comprises at least one Peltier element. The Peltier element is advantageously formed as a component in such a way that it can be installed directly into the heat exchanging device as a thermally active separating wall.

Heat is exchanged in the first stage in a passive manner between the liquid and the air (as heat transfer) and the temperature of the air is equaled to the temperature of the liquid. Heat is pumped in the second stage from the liquid to the air or in the reverse direction from the air to the liquid by supplying electric current to the at least one Peltier element. The Peltier element works as a heat pump which pumps heat from the liquid to the air when the air needs to be heated, and which pumps heat from the air to the liquid when the air is to be cooled. The liquid is not subjected in this process to any change in the aggregate state. The heat exchanging device further comprises a control device which contains a voltage source and/or a current source, and which is configured to generate the electric current flowing through the at least one Peltier element and to control said current accordingly.

The term "active" shall mean that heat is pumped by the supply of electrical power from the liquid to the air or, in the reverse direction of the electric current flowing through the at least one Peltier element, from the air to the liquid. In particular, heat can be pumped both from the hot to the cold side and also from the cold to the hot side of the thermally active separating wall. The term "passive" means in contrast that the heat transport between the liquid and the air is not supported by external supply of energy, so that the heat will only flow from the hot to the cold side of the thermally passive separating wall.

BRIEF DESCRIPTION OF THE DRAWING FIGURES

The invention will be explained below in closer detail by reference to embodiments and the drawings. The drawings are schematic and not shown true to scale. The same reference numerals are used for the same elements in the drawings.

DETAILED DESCRIPTION OF THE INVENTION

Figure 1:
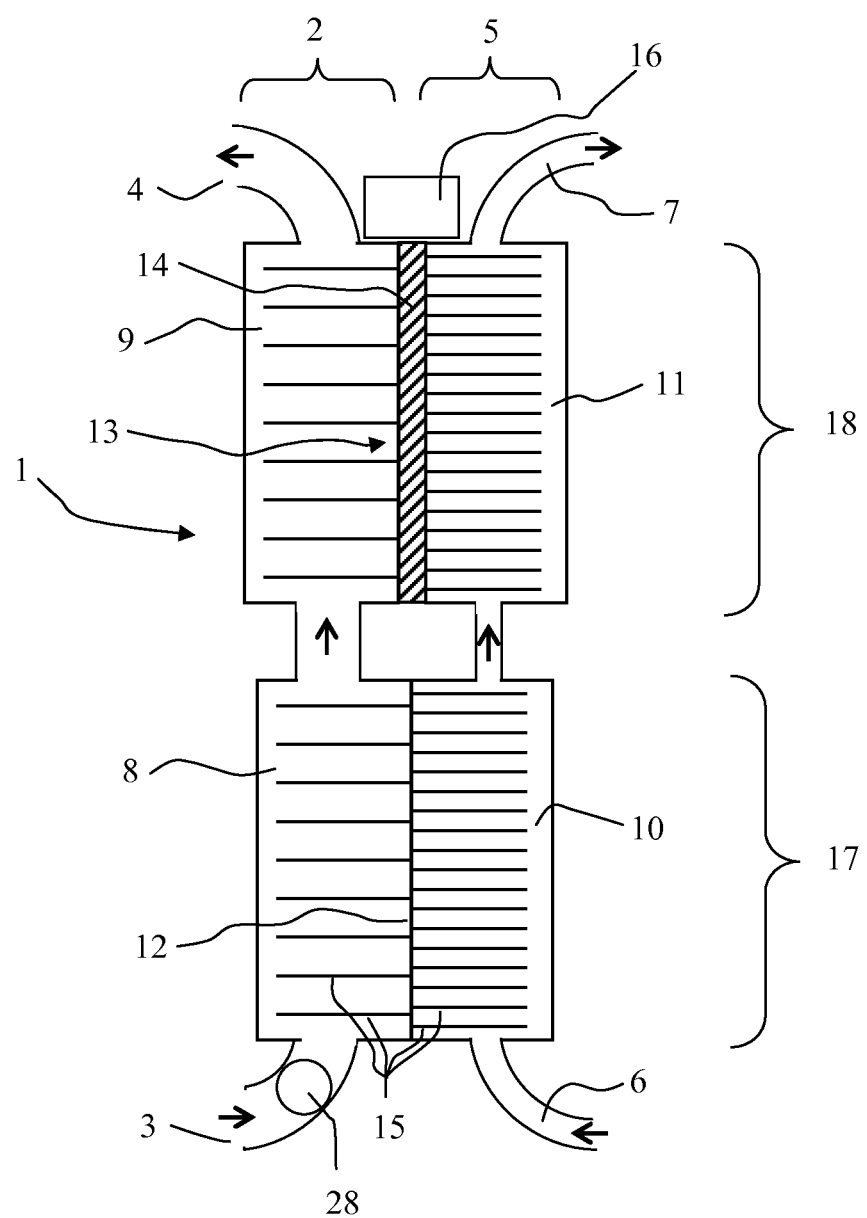
FIGS. 1-4 show different embodiments of a liquid-to-air heat exchanging device in accordance with the invention.

FIG. 1 schematically shows a liquid-to-air heat exchanging device in accordance with the invention for the exchange of heat between a liquid and air, which will be referred to below as heat exchanging device 1. The heat exchanging device 1 comprises a first flow channel 2 for the air, having a first inlet 3 and a first outlet 4, and a second flow channel 5 for the liquid, having a second inlet 6 and the second outlet 7. The preferred directions of flow of the air and the liquid in the flow channels 2 and 5 are illustrated by arrows. The first flow channel 2 comprises a first chamber 8 and a subsequent second chamber 9, the second flow channel 5 comprises a third chamber 10 and a subsequent fourth chamber 11. The first chamber 8 and the third chamber 10 are separated by a thermally passive separating wall 12, which consists of a material that conducts heat very well such as a metal for example. The second chamber 9 and the fourth chamber 11 are separated by a thermally active separating wall 13, which consists of at least one first Peltier element 14 or comprises at least one first Peltier element 14. The separating walls 12 and 13 can be provided on one or both sides with fins 15. The fins 15 are arranged for example as pieces of sheet metal, ribs, fingers, etc, so that they can emit heat to the air or liquid in the most efficient manner, or absorb said heat therefrom.

The heat exchanging device 1 further comprises a control device 16 which controls the current flowing through the first Peltier element 14. In order to fulfil this task, the control device 16 will be supplied with temperature signals or control commands by temperature sensors and/or a higher-level control device (not shown). The temperature sensors are disposed for example close to the inlets or outlets or in the chambers.

The first chamber 8 and the third chamber 10 jointly form together with the thermally passive separating wall 12 and, if present, the associated fins 15, a first stage 17 for the passive heat exchange between the liquid and the air. The second chamber 9 and the fourth chamber 11 form together with the thermally active separating wall 13 and, if present, the associated fins 15, and the control device 16 a second stage 18 for the active pumping of heat from the liquid to the air or vice versa.

The embodiment of the first stage 17 described by reference to FIG. 1 allows efficient heat exchange between the liquid and the air. However, the first stage 17 can also be realised by another heat exchanger which is suitable for the heat exchange between a liquid and air without any change in the aggregate state occurring in the second flow channel 5.

The liquid typically circulates in a closed circuit, through which it is conveyed by means of pumping means (not shown) and to which the heat exchanging device 1 is connected. The heat exchanging device 1, or a room air conditioner with the heat exchanging device 1, can further comprise a fan 28 in order to convey air through the flow channel 2. Natural convection can also be used for the flow through the flow channel 2. As is clearly shown in FIG. 1, the directions of flow of the air and the liquid extend in this example parallel with respect to each other in the same direction. A configuration for counter-current or cross-current is also possible however.

Figure 2:
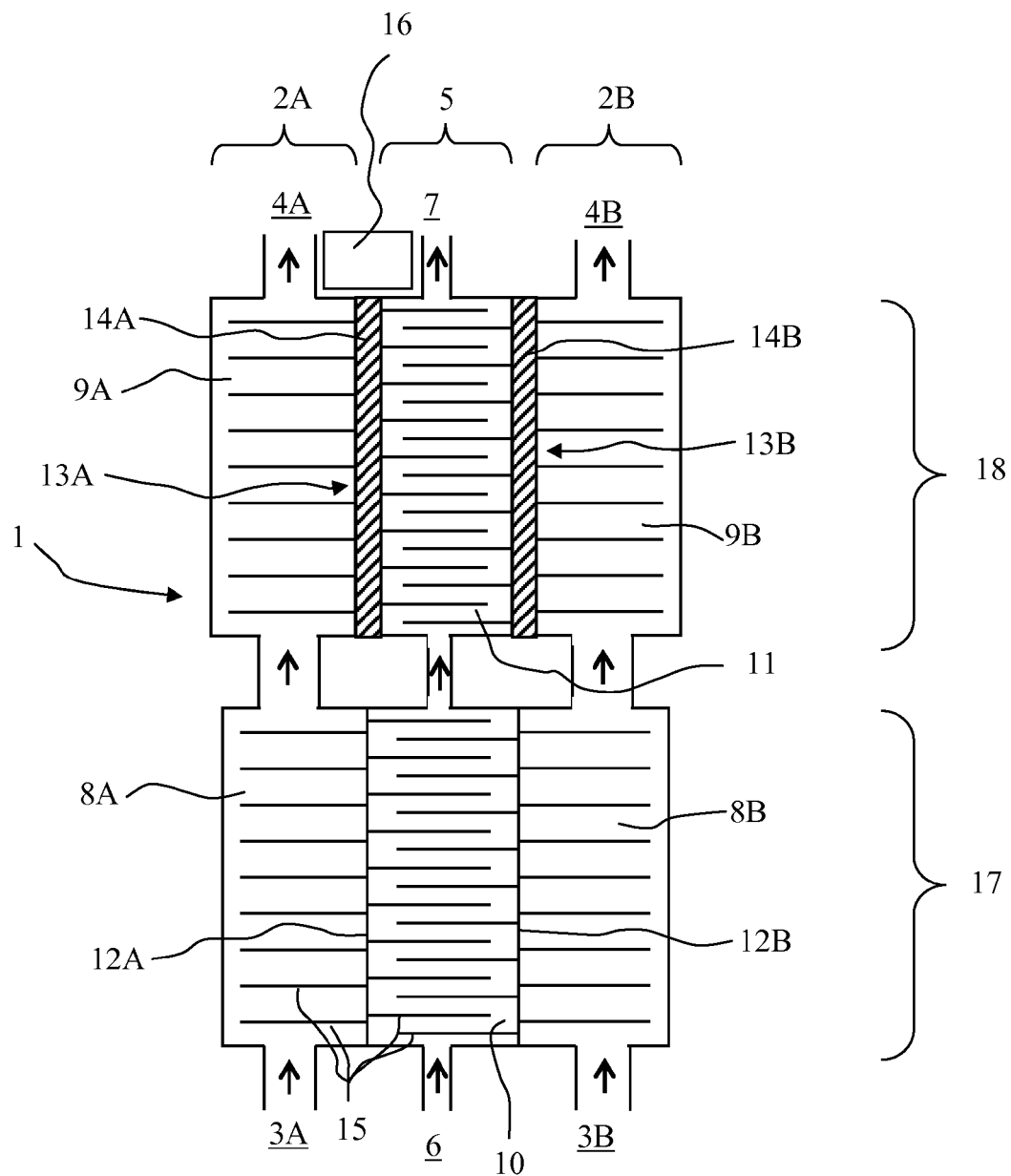

FIG. 2 shows an advantageous embodiment of the heat exchanging device 1 in accordance with the invention, in which an air flow channel 2A and 2B is arranged on either side of the liquid flow channel 5. The air flow channels 2A and 2B are separated in the first stage 17 by thermally passive separating walls 12A and 12B and in the second stage 18 by thermally active separating walls 13A and 13B from the liquid flow channel 5, wherein the thermally active separating walls 13A and 13B consist of at least one respective first Peltier element 14A and 14B (as in the preceding example) or contain a first Peltier element 14A and 14B. The reference numerals of the elements of the air flow channel 2A are supplemented by the letter A, and the reference numerals of the elements of the air flow channel 2B are supplemented by the letter B. The inlets 3A and 3B can be connected to each other, and the outlets 4A and 4B can also be connected to each other. The air in the flow channels 2A and 2B can also originate from another source for each channel and/or can be conveyed after exiting from the heat exchanging device 1 for each channel to another location. If necessary, the control device 16 is set up to operate the Peltier element 14A of the separating wall 13A independently from the Peltier element 14B of the separating wall 13B.

Figure 3:
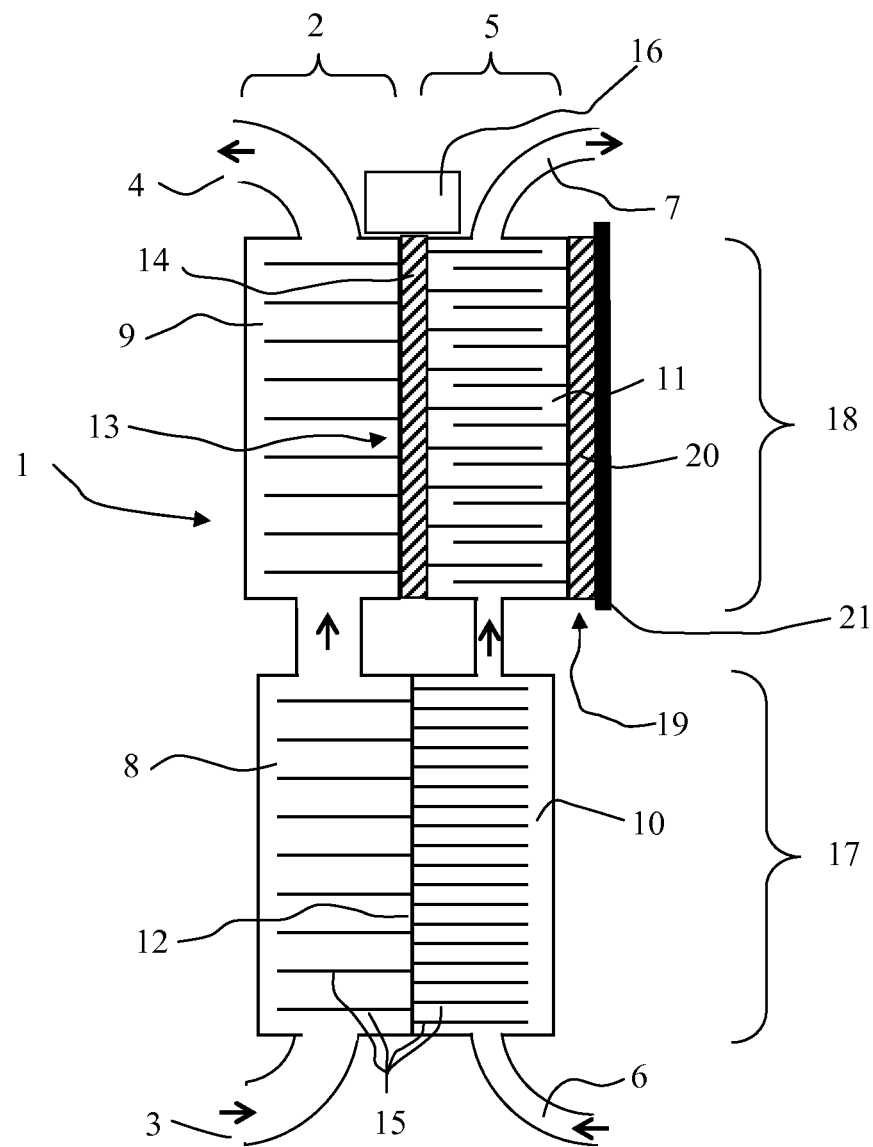

FIG. 3 shows a further embodiment of the heat exchanging device in accordance with the invention, in which a further wall of the fourth chamber 11 is formed as a thermally active separating wall 19, which consists of at least one second Peltier element 20 or comprises at least one second Peltier element 20, wherein the second Peltier element 20 is in good thermal contact with a part of an outside wall 21 of the heat exchanging device 1. The outside wall 21 is especially a front plate of the heat exchanging device 1, which consists of a material that conducts heat very well such as aluminium, so that the front plate with the second Peltier element 20 can be heated up and the heat emitted as radiation heat to the room in which the heat exchanging device 1 is located. The outside wall 21 ideally comprises a surface with high emission coefficient such as a non-metallic surface of suitable colour. In this example the thermally active separating wall 19 is disposed on the other side of the chamber 11 than the thermally active separating wall 13, i.e. the two thermally active separating walls 19 and 13 are mutually opposite boundaries of the chamber 11. The control device 16 is advantageously set up to operate the second Peltier element 20 independently from the first Peltier element 14.

Figure 4:
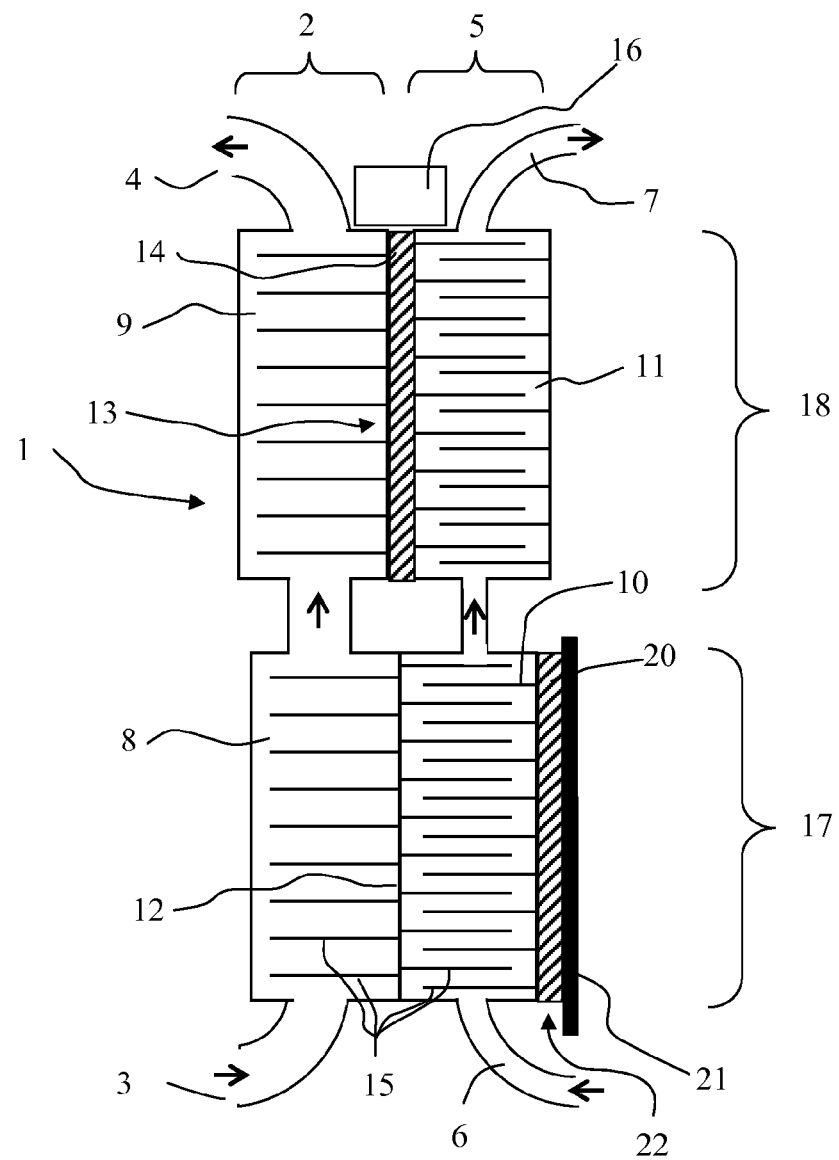

FIG. 4 shows an embodiment of the heat exchanging device in accordance with the invention in which, in contrast to FIG. 3, there is no further wall of the fourth chamber 11, but instead a further wall of the third chamber 10 is formed as a thermally active separating wall 22 from a second Peltier element 20. FIGS. 3 and 4 only show the part of the outside wall 21 which is in good thermal contact with the respective thermally active separating wall 19 and 22.

It is also possible to form both the fourth chamber 11 and also the third chamber 10 with the thermally active separating walls 19 and 22 which are in good thermal contact with the outside wall of the heat exchanging device 1 or the room air conditioner.

Figure 5:
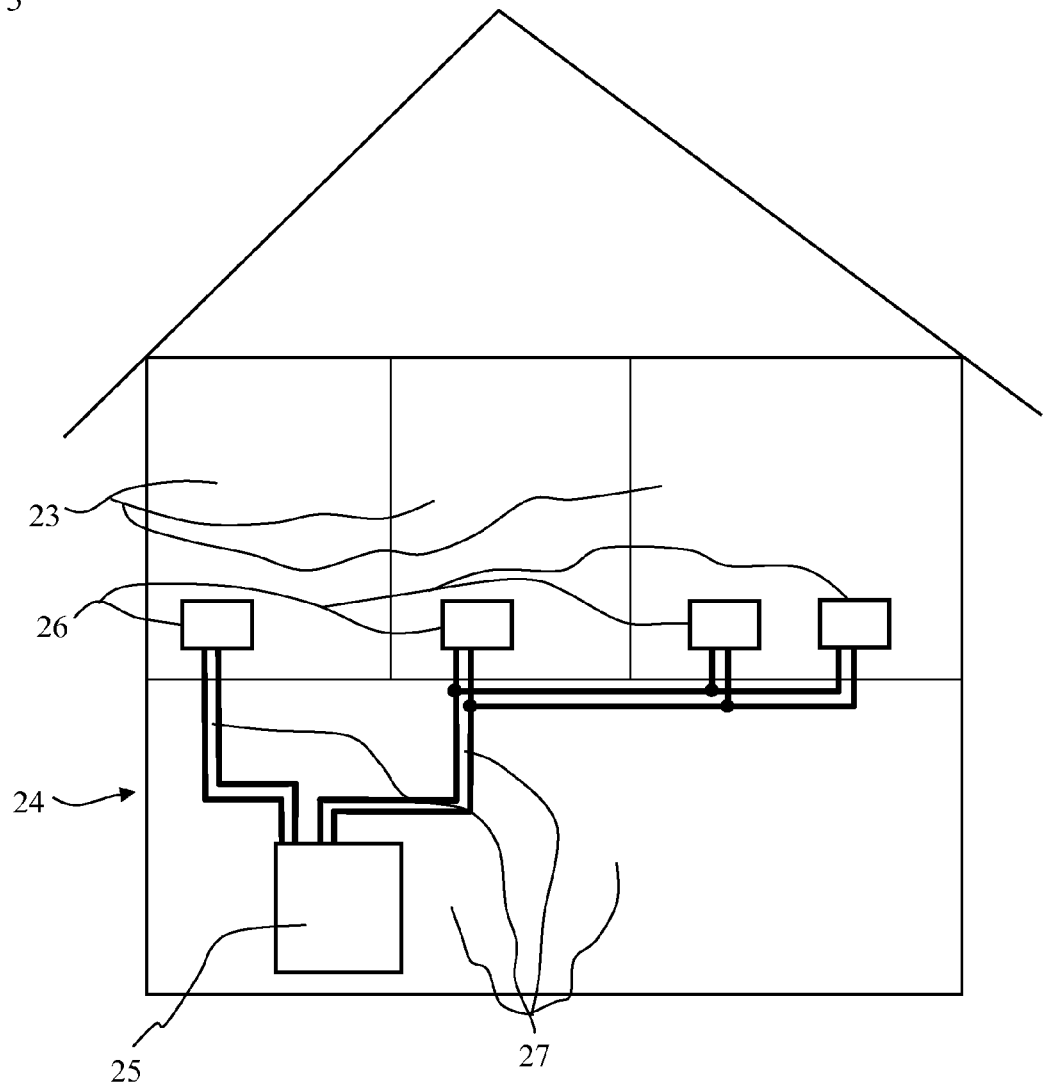
FIG. 5 shows an installation with such heat exchanging devices for heating and/or cooling rooms of a building, and FIG. 6 schematically shows a heat exchanging device arranged as a room air conditioner.

FIG. 5 illustrates an installation with heat exchanging devices 1 in accordance with the invention for heating and/or cooling rooms 23 of a building 24. The installation comprises a central heating device 25 and room air conditioners 26 arranged in the rooms 23 which comprise at least one heat exchanging device 1 in accordance with the invention. The heat exchanging devices 1 are connected via one or several heating circuits 27 to one respective feed line and one respective return line, in which the liquid circulates, in parallel manner to the heating device 25. The used liquid is usually water or a water-based liquid, but any other suitable liquid can be used. The central heating device 25 heats or cools the liquid to a specific flow temperature.

The functionality of such a heat exchanging device 1 will be explained below. The first passive stage 17 heats or cools the air flowing through the first chamber 8, in which passive heat transfer always occurs from the hotter to the cooler side, namely either from the first chamber 8 through the thermally passive separating wall 12 to the third chamber 10, or in the reverse direction from the third chamber 10 through the thermally passive separating wall 12 to the first chamber 8. The second, active stage 18 heats or cools the air flowing subsequently through the second chamber 9 by simultaneously cooling or heating of the liquid flowing through the fourth chamber 11 to the desired outlet temperature. This heat transport is achieved by supplying the first Peltier element 14 with an electric current.

The heat exchanging device 1 can also be used for dehumidifying the air, in that the air in the second stage 18 is cooled beneath the dew point by means of the first Peltier element 14. The control device 16 is configured in this case to set the current flowing through the first Peltier element 14 in such a way that the air will be cooled beneath the dew point.

The invention offers the following advantages:
The heat exchange between the liquid and the air occurs without any changes in the aggregate state of the liquid, i.e. the liquid always remains in the liquid state in the entire flow channel 5.
The increase (during heating) and decrease (during cooling) of the temperature of the air to the temperature of the liquid in the first stage 17 increases the efficiency.

The active cooling in the second stage 18 of the heat exchanging device 1 also allows dehumidifying the air by means of decreasing the air temperature beneath the dew point.

Figure 6:
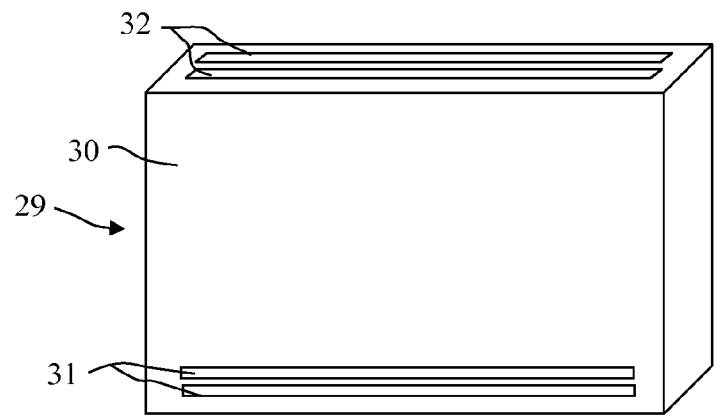

The room air conditioners 26 substantially consist of the heat exchanging device, i.e. the heat exchanging device is a room air conditioner when it is formed according to this purpose with a visually appealing housing. FIG. 6 schematically shows the housing 29 of such a heat exchanging device or room air conditioner. The housing 29 comprises a front panel 30 and first and second ventilation slits 31 and 32 which are arranged in front of the inlet 3 and the outlet 4. The first ventilation slits 31 are preferably arranged in the bottom region of the front panel 30, and the second ventilation slits 32 preferably in the upper region of the housing 29. The front panel 30 corresponds to the aforementioned front panel of the heat exchanging device 1.

The invention claimed is:

1. A room air conditioner, comprising
a liquid-to-air heat exchanging device for the exchange of heat between a liquid and air, comprising a first flow channel for the air and a second flow channel for the liquid, wherein the second flow channel connects an inlet and an outlet, which are connectable to an external circuit conducting the liquid;
a fan to convey air through the first flow channel, and
a control device, wherein
the heat exchanging device comprises a first stage in which the first flow channel and the second flow channel are separated by a thermally passive separating wall, and a subsequent second stage in which the first flow channel and the second flow channel are separated by a thermally active separating wall,
the thermally active separating wall consists of at least one first Peltier element, or comprises at least one first Peltier element, and
the control device is set up to generate and control an electrical current flowing through the at least one first Peltier element in such a way that heat is pumped from the liquid to the air when the air is to be heated, and heat is pumped from the air to the liquid when the air is to be cooled, wherein the liquid is not subjected to any change in the aggregate state.

2. The room air conditioner according to claim 1, wherein the first flow channel comprises a first chamber and a second chamber, that the second flow channel comprises a third chamber and a fourth chamber, the first chamber and the third chamber are separated by the thermally passive separating wall, and the second chamber and the fourth chamber are separated by the thermally active separating wall.

3. The room air conditioner according to claim 2, further including a third flow channel for the air, wherein the two flow channels for the air are arranged on both sides of the second flow channel for the liquid, wherein the third flow channel comprises a fifth chamber which is separated by a thermally passive separating wall from the third chamber, and a sixth chamber which is separated by a thermally active separating wall from the fourth chamber.

4. The room air conditioner according to claim 2, wherein a further wall of the third chamber is formed as a thermally active separating wall and/or a further wall of the fourth chamber as a thermally active separating wall, which further wall consists of at least one second Peltier element or comprises at least one second Peltier element and is in good thermal contact with a part of an outside wall of the room air conditioner.

5. The room air conditioner according to claim 3, wherein the thermally passive separating wall and/or the thermally active separating wall is provided on either side with fins.

6. The room air conditioner according to claim 1, wherein the control device is set up to cool the air beneath the dew point by means of the first Peltier element.

7. The room air conditioner according to claim 2, wherein the thermally passive separating wall and/or the thermally active separating wall is provided on either side with fins.

8. The room air conditioner according to claim 3, wherein the thermally passive separating wall and/or the thermally active separating wall is provided on either side with fins.

9. The room air conditioner according to claim 4, wherein the thermally passive separating wall and/or the thermally active separating wall is provided on either side with fins.

10. The room air conditioner according to claim 5, wherein the thermally passive separating wall and/or the thermally active separating wall is provided on either side with fins.

11. The room air conditioner according to claim 1, wherein the control device is set up to cool the air beneath the dew point by means of the first Peltier element.

12. The room air conditioner according to claim 2, wherein the control device is set up to cool the air beneath the dew point by means of the first Peltier element.

13. The room air conditioner according to claim 3, wherein the control device is set up to cool the air beneath the dew point by means of the first Peltier element.

14. The room air conditioner according to claim 4, wherein the control device is set up to cool the air beneath the dew point by means of the first Peltier element.

15. The room air conditioner according to claim 5, wherein the control device is set up to cool the air beneath the dew point by means of the first Peltier element.

16. The room air conditioner according to claim 6, wherein the control device is set up to cool the air beneath the dew point by means of the first Peltier element.

17. The room air conditioner according to claim 7, wherein the control device is set up to cool the air beneath the dew point by means of the first Peltier element.

18. The room air conditioner according to claim 8, wherein the control device is set up to cool the air beneath the dew point by means of the first Peltier element.

19. The room air conditioner according to claim 9, wherein the control device is set up to cool the air beneath the dew point by means of the first Peltier element.

20. The room air conditioner according to claim 10, wherein the control device is set up to cool the air beneath the dew point by means of the first Peltier element.

* * * * *